United States Patent [19]

Tiao

[11] Patent Number: 5,519,638
[45] Date of Patent: May 21, 1996

[54] AUTOMATIC SYSTEM FOR MONITORING AND REPLENISHING HAZARDOUS LIQUIDS IN TANKS

[75] Inventor: Kuo-Chen Tiao, Hsin-Chu, Taiwan

[73] Assignee: United Microelectronics Corporation, Hsin-Chu, Taiwan

[21] Appl. No.: 192,689

[22] Filed: Feb. 7, 1994

[51] Int. Cl.[6] .................................................. G01F 23/00
[52] U.S. Cl. ........................... 364/509; 364/510; 364/550;
364/500; 340/612; 340/614; 340/616; 340/618;
73/290 R; 73/301; 73/302; 137/386; 137/391;
137/393; 137/395
[58] Field of Search ................................ 364/509, 510,
364/500–502, 550; 137/101.19, 268, 2,
7, 4, 71, 101.25, 170.2, 187, 188, 255256,
386, 391, 393, 395, 396, 399, 426; 73/290 R,
301, 302, 307, 308, 312–314; 340/612,
614, 616, 618

[56] References Cited

U.S. PATENT DOCUMENTS

| | | | |
|---|---|---|---|
| 4,788,648 | 11/1988 | Ferretti et al. | 340/618 |
| 4,790,349 | 12/1988 | Harris | 137/393 |
| 4,901,245 | 2/1990 | Olson et al. | 364/509 |
| 5,015,995 | 5/1991 | Holroyd | 340/621 |
| 5,264,831 | 11/1993 | Pfeiffer | 340/618 |
| 5,339,854 | 8/1994 | Leith | 137/101.25 |
| 5,349,994 | 9/1994 | Koeninger | 137/386 |

*Primary Examiner*—Emanuel T. Voeltz
*Assistant Examiner*—Hal D. Wachsman
*Attorney, Agent, or Firm*—Meltzer, Lippe, Goldstein et al.

[57] ABSTRACT

An automatic system is disclosed which monitors and replenishes hazardous liquids in their holding tanks, as such liquids are typically used in manufacturing processes. The inventive system and method obviate the need for manual surveillance and handling of the hazardous liquids during the detection and replenishment maintenance tasks. In prior practice, maintenance personnel were subjected to dangers from the hazardous liquids and their noxious gases, while the work area (e.g., clean room) in the vicinity of the liquid tanks was also subjected to contamination.

13 Claims, 3 Drawing Sheets

AUTOMATIC SYSTEM FOR MONITORING AND REPLENISHING HAZARDOUS LIQUIDS IN TANKS

FIELD OF THE INVENTION

The disclosed invention comprises a processor circuit and method for automating the replenishment of hazardous liquids in tanks, such as are used in microelectronics manufacturing.

BACKGROUND OF THE INVENTION

Many manufacturing processes, such as those in the field of microelectronics, require the use of various acids and chemicals in liquid form. These liquids are extremely hazardous to human operators, and are also a potential contaminant to the work environment (such as a clean room) if not properly contained.

Typically, the liquids are held in large tanks, which supply their contents to the manufacturing process, on demand from a system controller. When the liquid level in a tank falls below a pre-determined "low" level, it must be replenished to maintain the production process. Traditionally, manual surveillance was used to detect the need for replenishment. Once this need was determined, the task of replenishing the liquid was accomplished manually by maintenance personnel. Due to the hazardous nature of the liquid, there was a constant danger to personnel, as well as to the integrity of the manufacturing environment. In addition, the production process would normally be shut down during the replenishment period.

It is an object of the present invention, therefore, to eliminate the aforementioned danger to manufacturing personnel by automating the replenishment task. The disclosed automated procedure precludes the need for human intervention in the maintenance of adequate liquid levels in the liquid containment tanks.

It is a further object of the present invention to protect the working environment area adjacent to the liquid tanks during the liquid replenishment process.

It is another object of the present invention to minimize downtime of the production process during the hazardous liquid replenishment process.

SUMMARY OF THE INVENTION

The disclosed invention is an automatic system for detecting the need for replenishment, and then accomplishing such replenishment, for tanks containing hazardous liquids, such as acids and chemicals.

The present invention comprises a liquid supply, a liquid tank, a system processor, and a liquid level control circuit.

The liquid supply is fed to the liquid tank by means of an ON-OFF valve, which is electronically operated by a signal from the liquid level control circuit.

The liquid tank contains a FULL level sensor and a LOW level sensor. When the tank liquid reaches a pre-set FULL level, the FULL sensor outputs a FULL signal to the system processor. Similarly, when the tank liquid falls below a pre-set LOW level, the LOW sensor outputs a LOW signal to the system processor.

When the tank is full, the system processor routes the FULL signal to the liquid level control circuit, which is placed in an "off" mode by the FULL signal. Thus, normal operation is maintained, and the ON-OFF supply valve remains in the OFF position.

When the liquid level falls below the FULL level, the FULL signal is no longer outputted to the system processor. Thus, no FULL signal is routed to the liquid level control circuit by the system processor, and the liquid level control circuit is placed in an "enable" mode.

When the tank liquid falls below the LOW level, a signal is outputted from the LOW level sensor to the system processor. When the system processor completes its operational cycle, it generates a RUN signal in response to the received LOW signal. The system processor then outputs both RUN and LOW signals to the liquid level control circuit.

The liquid level control circuit "ands" the LOW and RUN signals to produce an internal signal, which activates a switching relay and indicator light. The switching relay causes a DC voltage to be applied to the ON-OFF valve, which opens its flow gate between the liquid supply and the liquid tank. At the same time, the switching relay causes the same DC voltage to be applied to a pressure release valve, which is mounted in the liquid tank above the FULL liquid level. The pressure release valve vents the tank gases to expedite the liquid replenishment process.

When the tank liquid reaches the FULL level, the FULL sensor outputs a FULL signal. This FULL signal is routed through the system processor to the liquid level control circuit, which is again placed in an "off" mode. This de-activates the switching relay and the indicator light, and removes the DC voltage from both the ON-OFF valve and from the pressure release valve. Both valves close, and the replenishing process is terminated.

The presence of the FULL signal, combined with the absence of the LOW signal, causes the system processor to disable the RUN signal, and to begin a new operational cycle.

Thus, the present invention provides a completely automatic replenishment process, which safeguards personnel, equipment, and the environment. At the same time, production down time is minimized, due to the elimination of manual handling of the hazardous liquids.

For illustrative purposes, the preferred embodiment of the present invention is represented by an automatic acid tank supply system, utilizing a simple transistor logic control circuit.

DETAILED DESCRIPTION OF THE INVENTION

Figure 1:
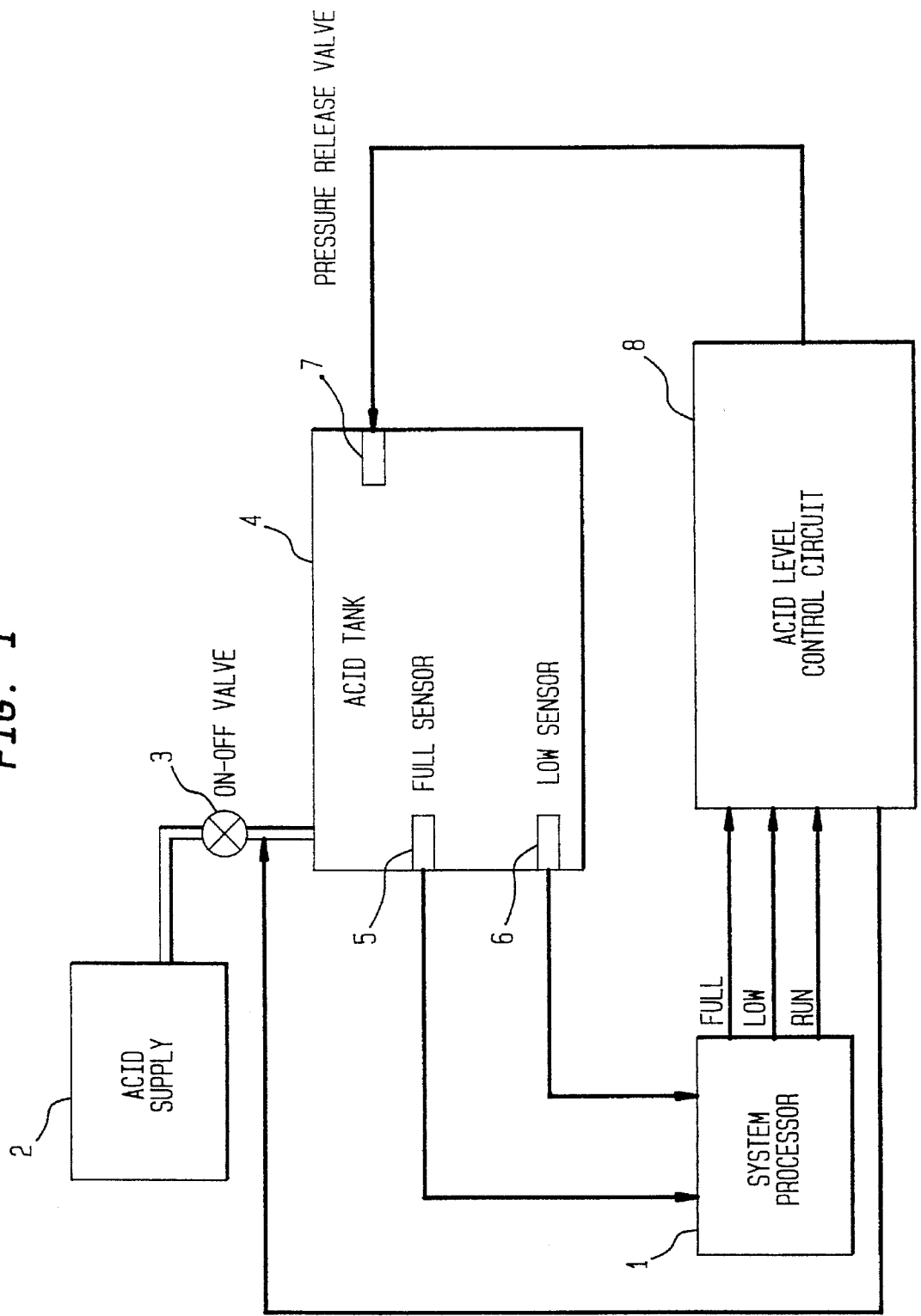
FIG. 1 illustrates a single automatic acid tank supply system.

The illustrated embodiment of an acid tank automatic supply system is depicted in block diagram form in FIG. 1.

An acid supply 2 is connected through an electronically controlled ON-OFF valve 3 to an operational acid tank 4. A FULL level sensor 5 is installed in tank 4, so that when the acid level reaches a pre-determined FULL level, FULL level sensor 5 outputs a FULL signal.

A LOW level sensor 6 is installed in tank 4, so that when the acid level falls below a pre-determined LOW level, LOW level sensor 6 outputs a LOW signal.

An electronically controlled Pressure Release valve 7 is also installed in tank 4, so that it can vent acid gases during the acid replenishment process.

A system processor 1 receives the FULL and LOW output signals from sensors 5 and 6, and outputs corresponding FULL and LOW logic signals. System processor 1 also outputs a RUN logic signal, upon receiving a LOW signal and having completed an operational cycle.

An acid level control circuit 8 receives the FULL, LOW, and RUN logic signals directly from system processor 1. When acid level control circuit 8 receives a FULL signal, control circuit 8 is disabled, and there are no outputs to either ON-OFF valve 3 or to Pressure Release valve 7. When acid level control circuit 8 receives both LOW and RUN signals, in the absence of a FULL signal, a DC voltage is outputted to both ON-OFF valve 3 and Pressure Release valve 7, opening the valves and initiating the replenishment of acid.

This process continues until the acid level in tank 4 reaches the FULL level, whereupon FULL sensor 5 outputs a FULL signal to system processor 1. System processor 1 then outputs a FULL logic signal to acid level control circuit 8, disabling the control circuit, closing valve 3 and valve 7 and terminating the replenishment of acid.

The FULL output signal from FULL sensor 5, in combination with no LOW output signal from LOW sensor 6, causes system processor 1 to disable the RUN output signal, and to reset its internal circuitry for the next operational cycle.

Figure 2:
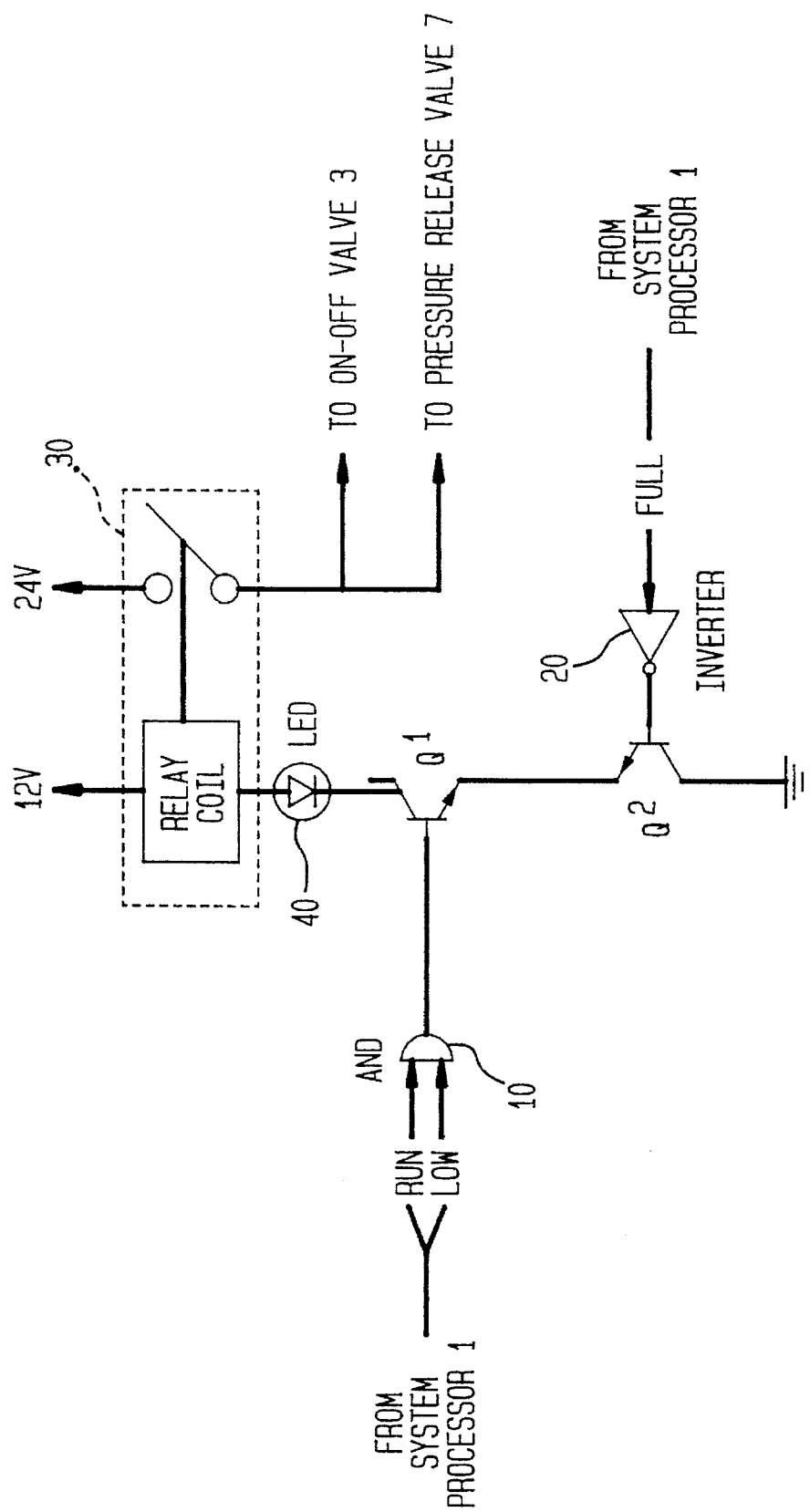
FIG. 2 schematically illustrates an acid level control circuit.

Acid level control circuit 8 is shown in detail in FIG. 2, and functions in the following manner.

When a FULL signal (logic high) is present at the input to inverter 20, the resulting output into the base of transistor Q2 is a logic low, cutting off Q2. Thus, no current can flow in Q2, Q1, LED 40, or relay 30. The contact arm of relay 30 remains in the normally open position, separating the 24v DC supply from ON-OFF valve 3 and Pressure Release valve 7. With no power applied, valve 3 and valve 7 remain closed. In this mode, no acid flows from supply 2 to tank 4, and no acid gas pressure is vented by valve 7.

When a FULL signal is not present at the input to inverter 20, the resultant output into the base of transistor Q2 is a logic high, enabling Q2 to conduct. Then, when AND gate 10 receives both a LOW signal and a RUN signal (logic highs), AND gate 10 outputs a logic high to the base of transistor Q1, causing Q1 to conduct.

Now, the series circuit of Q2, Q1, LED 40, and relay 30 is completed between the 12 vDC power source and circuit ground. Under this condition, current flows through Q2, Q1, LED 40, and the coil of relay 30. LED 40 is illuminated, indicating that control circuit 8 is active. The energized coil of relay 30 pulls its contact arm to the closed position. The closed contact arm of relay 30 connects the 24 v power source to ON-OFF valve 3 and Pressure Release valve 7. Valve 3 is thereby caused to open, allowing acid supply 2 to replenish the acid level in acid tank 4. At the same time, valve 7 is caused to open, venting the acid gas pressure in tank 4, which expedites the replenishment process.

When the acid level in tank 4 exceeds the LOW liquid level, LOW level sensor 6 ceases to output a signal to system processor 1, but system processor 1 maintains its RUN and LOW output signals to control circuit 8 until system processor 1 also receives a FULL signal from tank 4. This FULL signal is outputted from FULL sensor 5 when the acid level in tank 4 reaches the FULL level. When system processor 1 receives this FULL signal, it outputs a logic high to inverter 20 in control circuit 8. Inverter 20 then outputs a logic low signal to the base of transistor Q2, cutting off Q2. Thus, current can no longer flow in the Q2, Q1, LED 40, and relay 30 series circuit, deenergizing both LED 40 and the relay coil of relay 30. The contact arm of relay 30 reverts to its normally open position, removing 24 v power from valve 3 and valve 7. Valve 3 closes, shutting off the acid flow from supply 2 to tank 4, while valve 7 closes the gas vent of tank 4. System processor 1, having received a FULL signal in the absence of a LOW signal, disables its RUN and LOW output signals, and resets its internal circuitry to resume normal operation.

Figure 3:
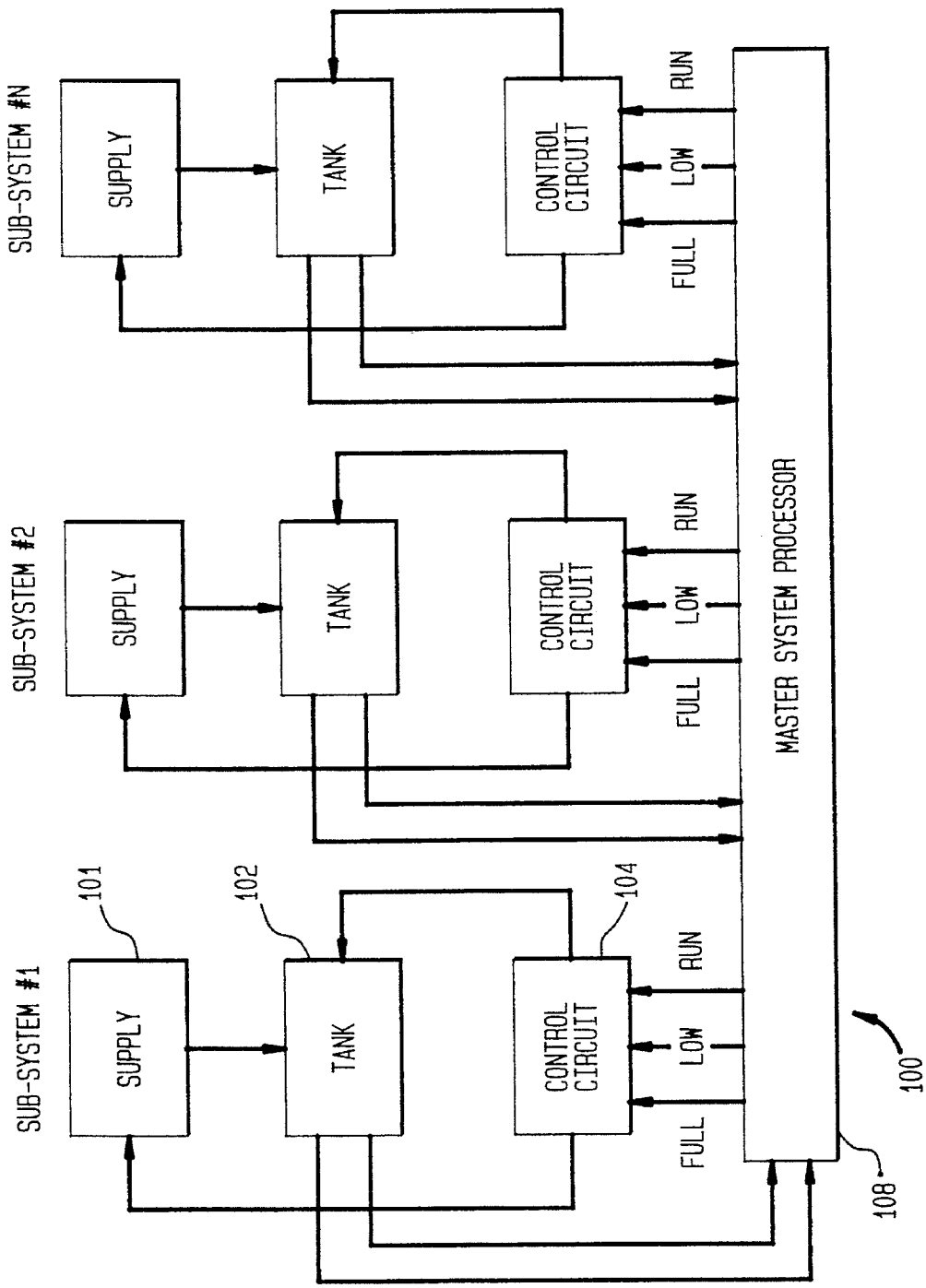
FIG. 3 illustrates a multiple tank automatic supply system.

While the above described embodiment of the present invention refers to a single tank replenishment system, many alternative embodiments are feasible. For example, a multiple tank supply system 100 is shown in FIG. 3, which can include any number of tank sub-systems, e.g., #1, #2, #3.

In such a multiple system, each sub-system is controlled by its own FULL and LOW signals, in conjunction with its corresponding supply 101, tank 102 and control circuit 104. The master system processor 108 outputs individual FULL and LOW signals to each sub-system control circuit 104, as in the above described single tank embodiment. However, the RUN signal output from the master system processor is common to all sub-systems, and is available only at the completion of an operational cycle.

Since many embodiments of the inventive automatic liquid replenishment system are possible, the scope of the present invention is limited only by the following claims.

I claim:

1. An automatic dangerous liquid tank replenishment system which eliminates the need for manual intervention, comprising:

a) a dangerous liquid tank;

b) a dangerous liquid supply for replenishing said dangerous liquid tank;

c) an electronically activated on-off valve, to open or close an output flow of said dangerous liquid supply;

d) a first dangerous liquid level sensor installed within said dangerous liquid tank, to output a first electronic signal when a dangerous liquid level within said dangerous liquid tank exceeds a predetermined FULL level;

e) a second dangerous liquid level sensor installed within said dangerous liquid tank, to output a second electronic signal when said liquid level falls below a predetermined LOW level;

f) an electronically activated pressure release valve, installed within said dangerous liquid tank, to release gaseous pressure while said dangerous liquid tank is being replenished;

g) a processor circuit for receiving said first and second electronic signals from said first dangerous liquid level sensor and from said second dangerous liquid level sensor;

h) said processor circuit for outputting a FULL logic signal in response to receiving said first electronic signal from said first dangerous liquid level sensor, and for outputting a LOW logic signal in response to receiving said second electronic signal from said second dangerous liquid level sensor;

i) said processor circuit for outputting a RUN logic signal, in response to receiving said second electronic signal from said second dangerous liquid level sensor;

j) a dangerous liquid level control circuit for receiving said FULL logic signal, said LOW logic signal, and said RUN logic signal from said processor circuit;

k) said dangerous liquid level control circuit for outputting an ON signal to said electronically activated on-off valve, in response to receiving said LOW logic signal and said RUN logic signal, while not receiving said FULL logic signal;

l) said dangerous liquid level control circuit for outputting a PRESSURE RELEASE signal to said pressure release valve, in response to receiving said LOW logic signal and said RUN logic signal, while not receiving said FULL logic signal;

m) said dangerous liquid level control circuit for outputting an OFF signal to said electronically activated on-off valve, in response to receiving said FULL logic signal;

n) said dangerous liquid level control circuit for outputting a CLOSE signal to said pressure release valve, in response to receiving said FULL logic signal;

o) said processor circuit for disabling said RUN logic signal in response to not receiving said LOW logic signal from said second dangerous liquid level sensor, and receiving said FULL logic signal from said first dangerous liquid level sensor.

2. The system of claim 1, wherein said processor circuit maintains said LOW and RUN logic signals until said FULL logic signal is received by said processor circuit.

3. The system of claim 1, wherein said dangerous liquid is an industrial acid.

4. The system of claim 3, wherein said industrial acid is used in the manufacture of microelectronic devices.

5. The system of claim 1, wherein said dangerous liquid is an industrial chemical.

6. The system of claim 5, wherein said industrial chemical is used in the manufacture of microelectronic devices.

7. The system of claim 1, wherein said processor circuit is configured to control a plurality of individual dangerous liquid replenishment systems.

8. An automatic dangerous liquid tank replenishment system which eliminates the need for manual intervention, comprising;.

a) a dangerous liquid tank;

b) a dangerous liquid supply for replenishing said dangerous liquid tank;

c) an electronically activated on-off valve, to open or close output flow of said dangerous liquid supply;

d) a first dangerous liquid level sensor installed within said dangerous liquid tank to output an electronic signal when a dangerous liquid level within said dangerous liquid tank exceeds a predetermined FULL level;

e) a second dangerous liquid level sensor installed within said dangerous liquid tank, to output an electronic signal when said liquid level falls below a predetermined LOW level;

f) an electronically activated pressure release valve, installed within said dangerous liquid tank, to release gaseous pressure while said dangerous liquid tank is being replenished;

g) processor circuit for receiving said electronic signal outputs from said first dangerous liquid level sensor and from said second dangerous liquid level sensor;

h) said processor circuit for outputting a FULL logic signal in response to receiving said electronic signal from said first dangerous liquid level sensor and for outputting a LOW logic signal in response to receiving said electronic signal from said second dangerous liquid level sensor;

i) said processor circuit for outputting a RUN logic signal, in response to receiving said LOW logic signal from said second dangerous liquid level sensor;

j) a dangerous liquid level control circuit for receiving said FULL logic signal, said LOW logic signal, and said RUN logic signal from said processor circuit;

k) said dangerous liquid level control circuit for outputting an ON signal to said electronically activated on-off valve, in response to receiving said LOW logic signal and said RUN logic signal, while not receiving said FULL logic signal;

l) said dangerous liquid level control circuit for outputting a PRESSURE RELEASE signal to said pressure release valve, in response to receiving said LOW logic signal and said RUN logic signal, while not receiving said FULL logic signal;

m) said dangerous liquid level control circuit for outputting an OFF signal to said electronically activated on-off valve, in response to receiving said FULL logic signal;

n) said dangerous liquid level control circuit for outputting a CLOSE signal to said pressure release valve, in response to receiving said FULL logic signal;

o) said processor circuit for disabling said RUN logic signal in response to not receiving said LOW logic signal from said second dangerous liquid level sensor, and receiving said FULL logic signal from said first dangerous liquid level sensor, wherein said dangerous liquid level control circuit is comprises of:

p) a first logic circuit, for and-ing said RUN and said LOW logic signals received from said processor circuit;

q) said first logic circuit output signal connected to input of a first transistor device;

r) a second logic circuit, for receiving said FULL logic signal from said processor circuit;

s) said second logic circuit output signal connected to input of a second transistor device;

t) an LED connected in series with said first and said second transistor devices;

u) said first and said second transistor devices and said LED connected in series with a switching relay coil;

v) said first and second transistor devices, said LED, and said relay coil connected in series between a first DC voltage and electrical ground;

w) a switching arm controlled by said relay coil, with the normally open terminal connected to a second DC voltage;

x) said switching arm, with the arm terminal connected to said ON and said OFF signal line output;

y) said switching arm terminal, also connected to said PRESSURE RELEASE and said CLOSE signal line output.

9. The circuit of claim 8, wherein said first logic circuit is a TTL AND gate.

10. The circuit of claim 8, wherein said second logic circuit is a TTL inverter.

11. A method of automatically replenishing a tank containing a dangerous liquid, comprising the steps of:

a) outputting a FULL signal from a first level sensor when a dangerous liquid level in said tank exceeds a predetermined FULL level;

b) disabling a dangerous liquid supply control circuit when said FULL signal is received by a processor circuit;

c) enabling said dangerous liquid supply control circuit when said FULL signal is not received by said dangerous liquid supply control circuit;

d) outputting a LOW signal from a second level sensor when dangerous liquid level in said tank falls below predetermined LOW level;

e) generating a RUN signal when said processor circuit receives said LOW signal; generating an output signal to said dangerous liquid supply control circuit from said processor circuit, derived from said RUN signal and said LOW signal;

g) activating said dangerous liquid supply control circuit, in response to said output signal from said processor circuit;

h) opening a dangerous liquid supply valve, in response to a signal from activated said dangerous liquid supply control circuit;

energizing an indicator light when said dangerous liquid supply control circuit is activated;

j) opening a pressure release valve, in response to said signal from activated said dangerous liquid supply control circuit;

k) disabling said dangerous liquid supply control circuit, in response to receiving said FULL signal from said first level sensor;

l) closing said dangerous liquid supply valve, in response to not receiving said signal from said dangerous liquid supply control circuit;

m) closing said pressure release valve, in response to not receiving said signal from said dangerous liquid supply control circuit;

n) de-energizing said indicator light when said dangerous liquid supply control circuit is not activated;

o) disabling said RUN signal from said processor circuit, in response to not receiving said LOW signal from said second level sensor, and to receiving said FULL signal from said first level sensor.

12. The method of claim 11, wherein said processor circuit generates a plurality of said output signals to a plurality of said dangerous liquid supply control circuits, in response to receiving a plurality of said FULL and LOW signals from a plurality of corresponding dangerous liquid tanks, each said tank being controlled by its respective said dangerous liquid supply control circuit.

13. The method of claim 11, further comprising the step of, after step j, maintaining said output signal from said processor circuit until said FULL signal is received by said processor circuit.

* * * * *